(12) United States Patent
Allford et al.

(10) Patent No.: US 8,357,876 B1
(45) Date of Patent: Jan. 22, 2013

(54) NARROW GAP ARC WELDING APPARATUS AND METHOD

(75) Inventors: Daniel Allford, Houston, TX (US); Randy Ellington, Houston, TX (US); Jordan Smith, Houston, TX (US)

(73) Assignee: ARC Specialties, Inc., Houston, TX (US)

( * ) Notice: Subject to any disclaimer, the term of this patent is extended or adjusted under 35 U.S.C. 154(b) by 321 days.

(21) Appl. No.: 12/712,458

(22) Filed: Feb. 25, 2010

Related U.S. Application Data

(60) Provisional application No. 61/157,295, filed on Mar. 4, 2009.

(51) Int. Cl.
*B23K 9/00* (2006.01)
(52) U.S. Cl. ........ 219/137 R; 219/54; 219/55; 219/136; 219/137.8
(58) Field of Classification Search ............ 219/54, 219/55, 136, 137 R, 137.8
See application file for complete search history.

(56) References Cited

U.S. PATENT DOCUMENTS

| | | | | |
|---|---|---|---|---|
| 3,576,966 | A | * | 5/1971 | Sullivan .................... 219/137 R |
| 4,188,526 | A | * | 2/1980 | Asano ........................ 219/137.8 |
| 4,270,037 | A | * | 5/1981 | Grinin et al. ............. 219/125.12 |
| 4,504,729 | A | * | 3/1985 | Asano ........................ 219/137 R |
| 6,596,969 | B1 | * | 7/2003 | Sakurai et al. ................ 219/122 |
| 2001/0047988 | A1 | * | 12/2001 | Hiraoka et al. .......... 219/137 PS |
| 2011/0006045 | A1 | * | 1/2011 | Yamamoto et al. ...... 219/130.01 |

* cited by examiner

*Primary Examiner* — Andy Huynh
(74) *Attorney, Agent, or Firm* — Egbert Law Offices, PLLC

(57) ABSTRACT

A method of arc welding a first metal piece to a second metal piece includes the steps of extend a welding head between the space between first and second metal pieces, bending a filler wire, passing the bent filler wire through the welding head such that an end of the bent filler wire extends in a direction toward a surface of one of the first and second metal pieces, and arc welding the end portion of the bent filler wire onto the surface of the metal piece. The method further includes rotating the end of the bent filler wire toward another surface of the metal pieces and arc welding the of end of the rotated bent filler wire onto the surface of the another metal piece. The welding head travels along the space between the first and second metal pieces as the step of arc welding occurs.

13 Claims, 4 Drawing Sheets

NARROW GAP ARC WELDING APPARATUS AND METHOD

RELATED U.S. APPLICATIONS

The present application claims priority from U.S. Provisional Patent Application No. 61/157,295, filed on Mar. 4, 2009.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of welding. More particularly, the present invention relates to the field of welding where there is a narrow welding gap. Even more particularly, the present invention relates to narrow gap welding using submerged arc welding and gas metal arc welding technologies.

2. Description of Related Art Including Information Disclosed Under 37 CFR 1.97 and 37 CFR 1.98.

Submerged arc welding (SAW) is common arc welding process. SAW requires a continuously feed consumable solid or tubular electrode. The molten weld and the arc zone are protected from the atmospheric contaminations by being submerged under a blanket of granular fusible flux consisting of lime, silica, manganese oxide, calcium floride, and other compounds. When molten, the flux becomes conductive, and provides a current path between the electrode and the work. This thick layer of flux completely covers the molten metal thus preventing spatter and sparks as well as suppressing the intense ultraviolet radiation and fumes that are part of the SMAW (shielded metal arc welding) process.

SAW is normally operated in the automatic or mechanized mode, however, semi-automatic hand held SAW guns with pressurized or gravity flux speed delivery are available. The process is normally limited to the flat or horizontal-fillet welding positions. Although currents range from 300 to 2000 A are commonly utilized, currents of up to 5000 A have also been used for multiple arcs.

Single or multiple (2-5) electrode wired variation of the process exist. SAW strip-cladding utilizes a flat strip electrode. DC or AC can be utilized, and combinations of DC and AC are common on multiple electrode systems. Constant voltage welding power supplies are most commonly used, however constant current systems in combination with the voltage sensing wire feeder are available. SAW filler material usually is a standard wire as well as other special forms. This wire normally has a thickness of 1/16 inch to 1/4 inch. In certain circumstances, twisted wire can be used to give the arc an oscillating movement. This helps fuse the toe of the weld to the base metal.

SAW can be used for various types of material applications, including: carbon steels, low alloy steels, stainless steels, nickel-based alloys and surfacing applications. There are many advantages to using the SAW process including high deposition rates and high operating factors in mechanized applications. Deep weld penetration and minimal welding fumes or arc lights are also advantages to the SAW process. Additionally, minimum welding fume or arc light is emitted. Sound wells are readily made and high speed welding of thin sheets of steel is possible through the SAW process.

Various patents have issued in the past regarding submerged arc welding. For example, U.S. Pat. No. 5,214,265, issued on May 25, 1993 to Pollack, teaches a high-speed, low deposition SAW apparatus and method. The method and apparatus has four electrodes positioned along a line from front to rear. The first of the electrodes is supplied with direct current, and the remaining three electrodes are supplied with alternating current. The direct current electrode generates an arc that penetrates the base metal and initiates a weld. The other electrodes are supplied with alternating current having a 90° current separation between the leading and trailing AC electrodes, and the trailing and middle AC electrodes. Alternating current is supplied between the trailing and middle AC electrode, having a 180° current separation. The AC electrodes combine to generate an arc that deposits a filler and shapes the weld.

U.S. Pat. No. 5,140,140, issued on Aug. 18, 1992 also to Pollack, describes a method and apparatus of submerged arc welding with electrodes in tandem. The method and apparatus uses five electrodes having direct current connecting to one electrode and alternating current connected to the other four electrodes. The electrodes are aligned in a row with predetermined angles to the direction of the weld. Alternating current is supplied to the electrodes so that a 90° phase difference is applied to adjacent electrodes and a 180° phase difference is applied between alternating electrodes. With such power application and the electrical connections of the electrodes, the welding process has a more stable weld puddle that suppresses welding defects at higher speeds than previously achievable.

U.S. Pat. No. 3,859,495, issued on Jan. 7, 1975 to Takahashi et al., describes a submerged-arc welding machine. The submerged-arc welding machine has a welding head pivoted to a frame of the machine so as to be rockable across the seam of a workpiece being welded. Additionally, the machine has a vertically-movable oscillation mechanism with an eccentric cam engaging the welding head for causing the welding head to rock across the seam as the cam rotates. Further included is an oscillation amplitude adjusting device for moving the oscillation mechanism as well as the cam vertically, whereby the axis of rotation of the cam is adjustable relative to that point on the frame about which the welding head pivots to adjust the amplitude of the rockable movement of the welding head.

Various patents have also issued in the past relating to narrow gap or narrow groove welding. For example, U.S. Pat. No. 4,254,322, issued on Mar. 3, 1981 to Asano, describes a narrow weld groove welding process and apparatus using gas metal arc welding. In this process, a bare welding wire is fed into a weld groove defined between the opposed surfaces of two pieces of metals for producing a metal arc therein for welding. In this process, a welding wire is subjected to a plastic deformation of a wave form, before being fed into a nozzle hole provided in a contact tip. Then, the wire is fed into a nozzle hole, while maintaining elasticity tending to cause waving. The tip of a welding wire being fed through a nozzle exit is automatically waved between the opposed surfaces of metals to be joined, with the tip of wire being alternately faced in the opposite direction in response to the weaving motion thereof.

U.S. Pat. No. 3,576,966, issued on May 4, 1971 to Sullivan, describes a patent similar to the Asano patent, but uses two axes and again is limited to gas shielded welding. In this patent, a welding wire of serpentine form is fed into an electric arc in a narrow gap between workpieces to be joined. The wire passes through a contact tube which is sheathed in electrical insulation to avoid short-circuiting to the workpieces. The serpentine form of the wire serves to direct the arc toward one side of the gap or the other in periodic oscillations as the electrode is moved lengthwise of the gap from one end to the other. The seam is built up layer-by-layer in repeated passes of the electrode.

Patents have also issued which deal with narrow groove welding using submerged arc welding technologies. For example, U.S. Pat. No. 4,442,334 issued on Apr. 10, 1984 to Lux et al., describes a device for feeding welding wire in a submerged arc welding operation in which there is a narrow gap between workpieces which are to be welded together. A guide support has a plurality of spaced-apart welding wire straightening roller assemblies mounted thereon. The roller assemblies are in a position at selected angles relative to each other around and in engagement with the welding wire and define a feed guide path for the passage of the welding wire between the rollers of each assembly. A welding head is pivotally mounted on a support for pivotal movement transverse to the welding direction. The head includes a welding guide and a carrying guide which together define tongs of the head. The tongs are mounted on the support for pivotal movement toward and away from each other. Tongs carry a plurality of guide shoes which define a continuing guide path for the welding wire received from the welding wire feed guide and deliver it to the welding zone between the workpieces. A contact piece associated with the current carrying guide provides current for the welding operation. The construction includes three straightening roller assemblies with three roller assembly elements which are rotatable relative to each other in a direction around the periphery of the wire which they cooperate to guide and straighten. The welding head includes a welding guide blade and a current carrying guide blade which are pivotally mounted on a hinge bolt. Straightening roller units are carried in a cylindrical roller housing on the support. Each of the roller housings has a substantially tubular shell which is designed with an upper inside recess and with a lower centering extension to be snugly fitted into the recess of each following roller housing.

Gas metal arc welding (GMAW) is another type of welding process. GMAW, sometimes referred to by subtypes metal inert gas welding or metal active gas welding, is a semiautomatic or automatic arc welding process in which a continuous and consumable wire electrode and a shielding gas are fed through a welding gun. A constant voltage, direct current power source is most commonly used with GMAW, but constant current systems, as well as alternating current, can be used. There are four primary methods of metal transfer in GMAW, referred to as globular, short circuiting, spray, and pulsed-spray. Each of these methods have stage properties and corresponding advantages and limitations.

Originally developed for welding aluminum and other non-ferrous materials in the 1940's, GMAW was soon applied to steels because it allowed for lower welding time compared to other welding processes. The cost of inert gas limited its use in steels until several years later, when the use of semi-inert gases such as carbon dioxide became common. Further developments during the 1950's and 1960's gave the process more versatility and, as a result, it became a highly used industrial process. Today, the automobile industry in particular uses GMAW almost exclusively. Unlike welding processes that do not employ a shielding gas, such as shielded metal arc welding, GMAW is rarely used in outdoors or in other areas of air volatility. A related process, flux cord arc welding, often does not use a shielding gas, instead employing a hollow electrode wire that is filled with flux on the inside.

Various patents in the past have issued relating to gas metal arc welding. For example, U.S. Pat. No. 4,301,355 issued on Nov. 17, 1981 to Kimbrough et al., describes a gas metal arc welding system. In the system, power is delivered to the welding arc from a constant-current rapid-response power supply controllable to maximize arc stability particularly in out-of-position welding operations. A first control modulates the output current from the power supply between a high value close to the maximum output value and a minimum value just sufficient to maintain the welding arc. The modulation is effected at a given frequency appropriately adjusted in accordance with the electrode material and diameter to maintain optimum spray metal transfer in the welding arc. A further control is effected by pulse width modulating the output from the power supply in accord with a set-in current programmed signal which is compared with a current feedback signal or, alternatively, a set in voltage programmed signal which is compared with a voltage feedback signal. This latter control provides for operation of the power supply in a constant current control mode or, alternatively, a constant voltage control mode. Still further control of the power in the welding arc is effected by pulsing the current between base and peak levels at a relatively low frequency which enables control of the weld puddle in out-of-weld positions.

U.S. Pat. No. 4,529,863, issued on Jul. 16, 1985 to Lebel, describes a GMAW method. A consumable wire electrode is held within and fed through the tubular contact tip of a continuous feed-type welding gun having a tubular nozzle surrounding and extending beyond the tip. A shielding gas, formed of unique ratios of a minor proportion of a carbon dioxide and oxygen mixture combined with a major proportion of an argon and helium mixture, is flowed in a substantially longitudinally laminar pattern between the nozzle and contact tip and along the electrode extension from the tip. The contact tip is cooled, and sufficiently high power electrical current is passed through the contact tip and electrode extension to produce the arc and to melt the end of the electrode into molten drops for short-circuiting or for spray transfer of the drops to the weld deposit. The electrode extension is preheated by maintaining a long electrode extension or stick-out beyond the contact tip end, with a substantial portion of the extension recessed within the nozzle.

It is an object of the present invention to provide a narrow gap welding apparatus and method that reduces the volume of weld metal.

It is another object of the present invention to provide a narrow gap welding apparatus and method that reduces the preparation requirements for the weld site.

It is yet another object of the present invention to provide a narrow gap welding apparatus and method that does not require cutting a V-shape into the material to be welded together.

It is a further of the present invention to provide a narrow gap welding apparatus and method that does not require beveling of parts.

It is an object of the present invention to provide a narrow gap welding apparatus and method that can be used in a narrower groove.

It is yet another object of the present invention to provide a narrow gap welding apparatus and method that requires fewer welding passes to complete the weld.

These and other objects and advantages of the present invention will become apparent from a reading of the attached specification and appended claims.

BRIEF SUMMARY OF THE INVENTION

The present invention is an arch welding apparatus that comprises a welding head having a longitudinal axis, and a filler wire extending through the welding head so as to have an end portion extending outwardly therefrom. The end portion is bent at an obtuse angle with respect to the longitudinal axis of the welding head so as to face toward one direction.

A rotating means is connected to the filler wire so as to cause end of the filler wire to face in an opposite direction. A bending means is cooperative with the filler wire for bending the filler wire at a desired angle prior to passing through the welding head.

The apparatus of the present invention also includes a first metal piece having a surface, and a second metal piece having a surface facing a surface of the first metal piece. The end of the filler wire and a portion of the welding head extend into space between the surfaces of the first and second metal pieces. The surfaces of the first and second metal pieces are in generally parallel relationship to each other. A backing bar is positioned at a bottom of the metal pieces and extends across the space.

In the present invention, the "bending means" includes a plurality of rollers that are positioned adjacent the welding head. The filler wire extends through the plurality of rollers. The bending means can also include various other apparatus that can impart a desired bend to the filler wire. Such other "means" can include a roller in combination with a forming element, a pair of forming elements arranged in spaced relation to each other, and similar apparatus. The "rotating means" is the result of the bend imparted by the bending means. Alternatively, it is possible that a "rotating means" can be integrated into the welding head itself so as to desirably rotate the bent end of the filler wire in a desired direction. The "bending means" and the "rotating means" can be computer-controlled so as to allow the present invention to be adapted for automatic processing.

The present invention is also a method of arc welding a first metal piece to a second metal piece. The method includes the steps of: (1) extending a welding head into a space between the first and second metal pieces; (2) bending a filler wire; (3) passing the filler wire through the welding head such that an end of the filler wire extends in a direction toward a surface of the first and second metal pieces; and (4) arc welding the end portion of the filler wire onto the surface of the metal piece.

This method also includes rotating the end portion of the bent filler wire toward another surface of the first and second metal pieces and arc welding the end of the rotated bent filler wire onto the surface of such metal piece. The welding head travels along the space between first and second metal pieces. The step of rotating occurs after the step of traveling. The welding head is moved upwardly in space between the first and second metal pieces such that the bent filler wire extends in a direction toward one of the first and second metal pieces. The welding head can then travel along the space between the first and second metal pieces such that a welding head is applied to the surface of one of the first and second metal pieces.

This method also includes forming a welding head area by forming the space between the first and second metal pieces. The surface of the one of the first and second metal pieces is generally parallel to a surface of another of the first and second metal pieces. A backing plate is positioned against a bottom of the first and second metal pieces. This backing plate extends across the spaces between the first and second metal pieces.

The step of bending includes passing the filler wire through a plurality of rollers prior to passing the bent filler wire through the welding head.

DETAILED DESCRIPTION OF THE INVENTION

Figure 1:
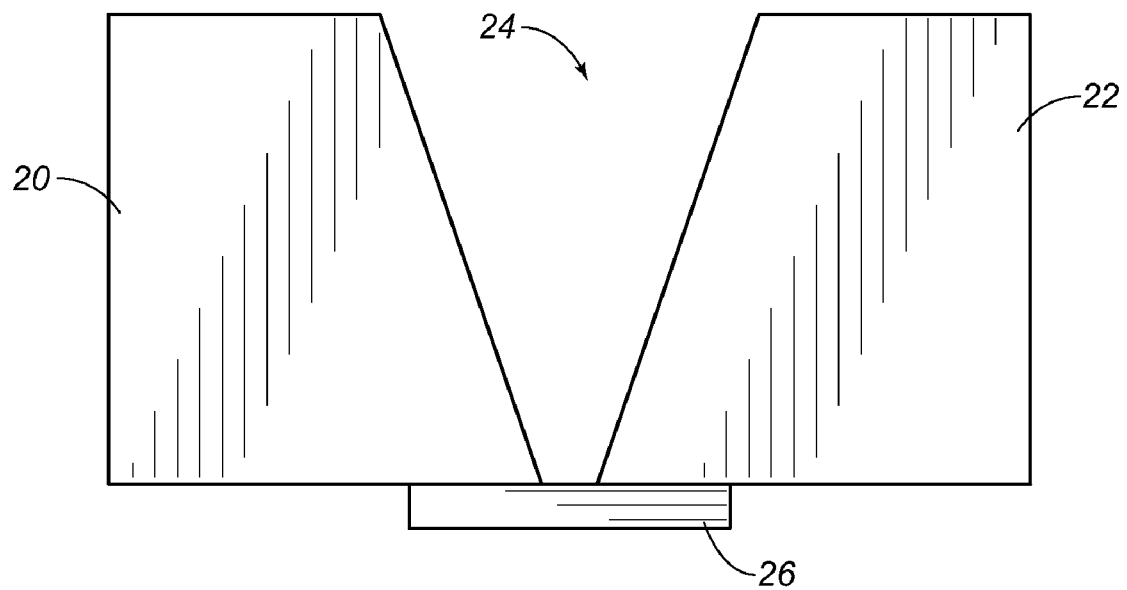
FIG. 1 is a plan view showing the conventional welding area.

Referring to FIG. 1, there is shown the typical weld area need for a standard V butt joint using techniques of the prior art. The two metals to be joined together, first metal piece 20 and second metal piece 22 are shown opposite each other. A backing bar 26 is shown below the first metal piece 20 and the second metal piece 22. A V-cut 24 is shown between the first metal piece 20 and the second metal piece 22. For standard V-butt joint welds a 38° cut is generally required to be established between the first metal piece 20 and the second metal piece 22. This enables the wire and welding head of the prior art welding methods to fit between the first metal piece 20 and the second metal piece 22.

Figure 2:
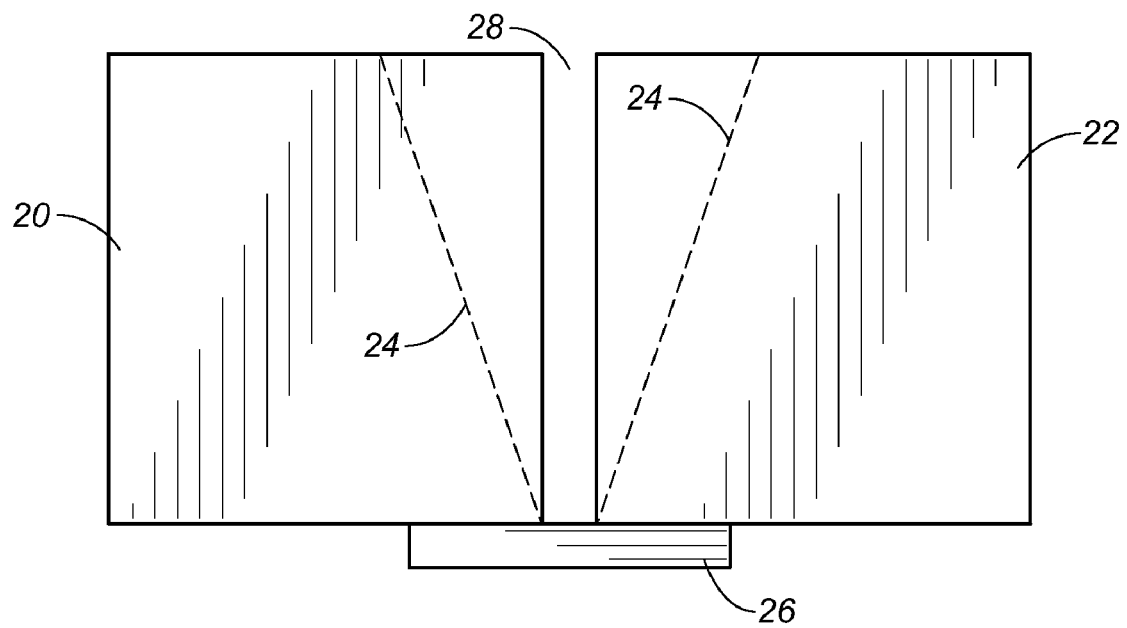
FIG. 2 is a plan view showing the welding area of the present invention in reference to the welding area of the conventional techniques.

FIG. 2 shows the welding area required for the apparatus and method of the present invention as well as the welding area required for the standard V-butt joint of the prior art. First metal piece 20 and second metal piece 22 are shown opposite each other. The backing bar 26 is shown beneath the first metal piece 20 and second metal piece 22. Importantly, in FIG. 2, it can be seen that the narrow groove 28 extends between the first metal piece 20 and the second metal piece 22. For comparison, the V-cut 24 for standard V-butt joint welds of the prior art is shown in FIG. 2, represented by dashed lines. As shown the V-cut 24 is substantially larger than the narrow groove 28 required for the welding apparatus and method of the present invention. In the prior art, the wire of the weld comes out of the welding head straight. In order for the weld to be filled, the welding head would have to be tilted to fill the V-cut area 24. The required tilting of the welding head requires that the V-cut 24 be substantial enough to allow for the head to fit therein when tilted. Using the welding apparatus and method of the present invention, a 75% reduction of volume necessary to complete the welds. In the present invention, there is no need to be able to point the torch or head towards the wall of the cut 24.

Figure 3:
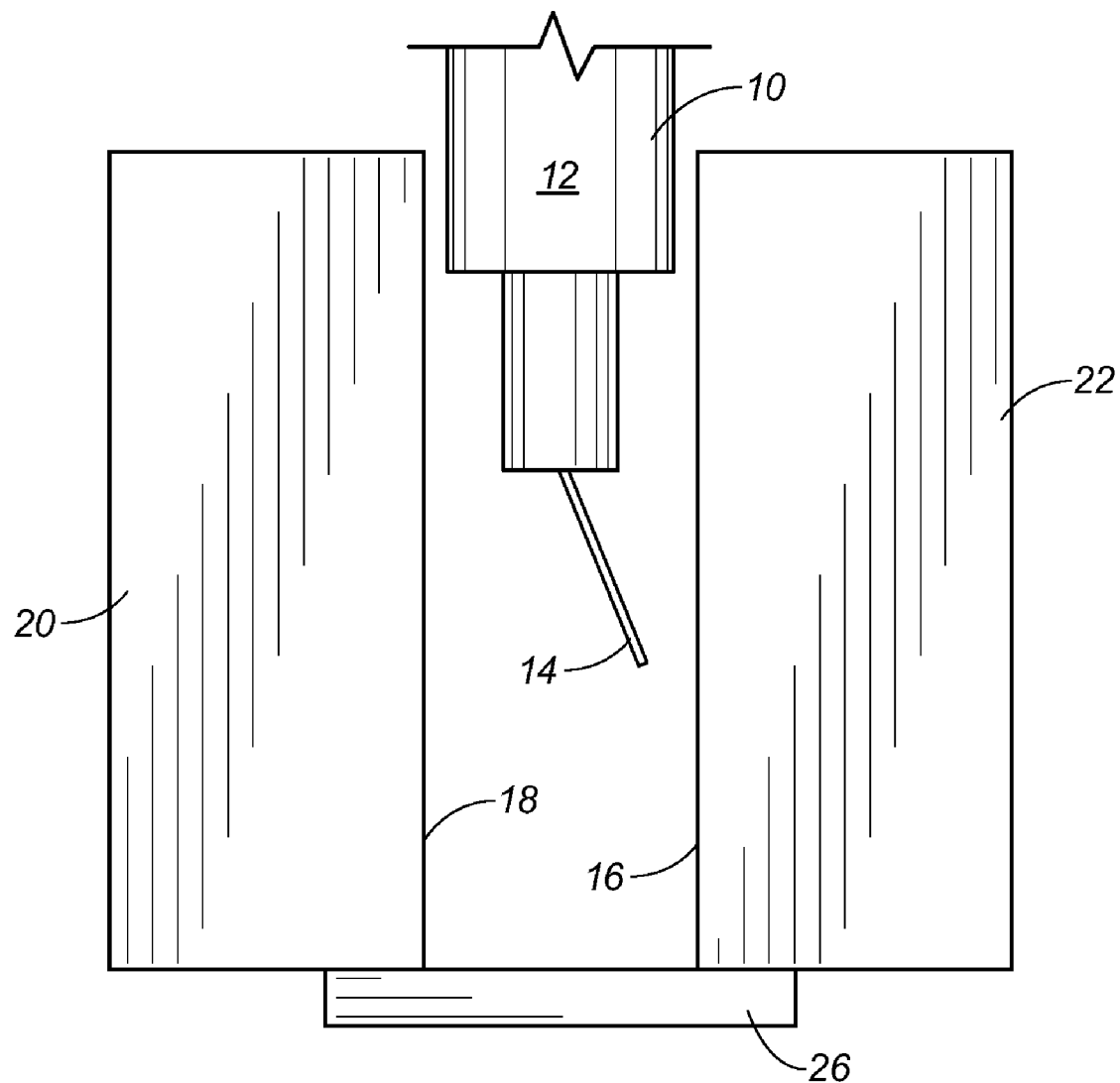
FIG. 3 is an isolated view showing the welding head and wire of the present invention.

Referring to FIG. 3, there is shown the welding apparatus 10 of the present invention. The head 12 of the welding apparatus 10 is placed between the first metal piece 20 and the second metal piece 22. Below the first metal piece 20 and the second metal piece 22 is the backing bar 26. The welding head 12 is shown as extending into the narrow gap 28 of the weld. The wire 14 extends outwardly from the welding head 12 at an obtuse angle acute relative to the longitudinal axis of the welding head 12. As shown, the wire 14 points toward the second wall 16 of the second metal piece 22. This focuses the welding arc on the wall 16. By placing the arc on the wall of the joint, complete fusion is ensured without the need for beveling of the parts. A pass is made along the second metal piece 22, after which the head 12 is rotated so that the wire 14 is angled towards the first wall 18 of the first metal piece 20. The apparatus 10 then passes over the weld with the wire angled towards the first metal piece 20. After the second pass, the head 12 is then raised and the process is repeated until the weld is completed. Importantly, after one pass of the weld is completed, the head 12 of the present invention does not need to be tilted or otherwise moved horizontally so that the wire 14 faces the first wall 18 or the second wall 16. The bending of the wire enables the torch or head 12 to remain at an angle that is substantially vertical. The head 12 is simply rotated about a vertical axis to adjust the position of the wire 14.

Figure 4:
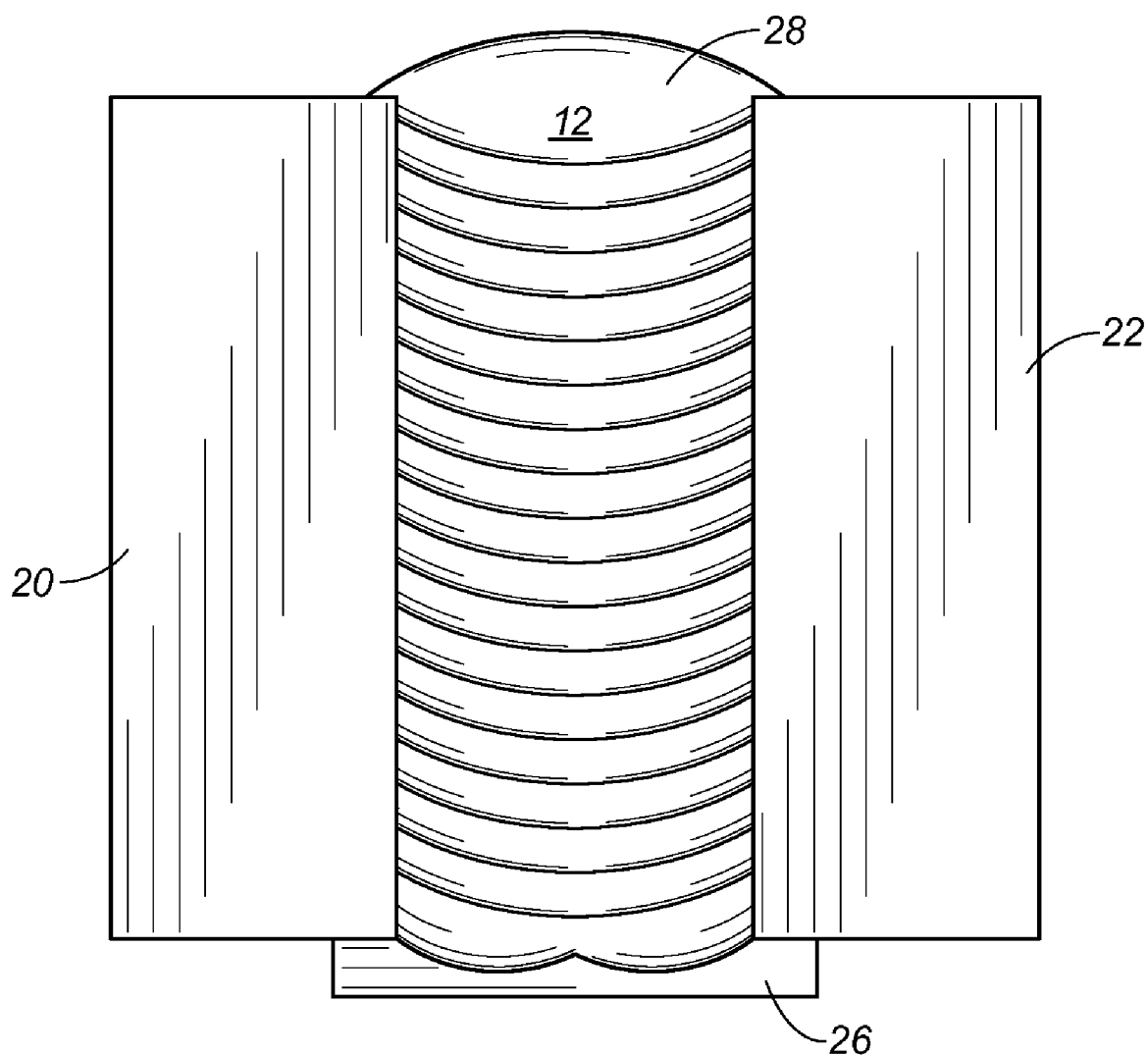
FIG. 4 is an isolated view of a weld using the welding apparatus and method of the present invention.

FIG. 4 shows a completed weld using the welding apparatus and method of the present invention. The weld 28 requires substantially less weld material than required by the method of the prior art. This method and apparatus of welding importantly requires fewer weld passes and a much narrower groove to achieve a substantially similar weld.

Figure 5:
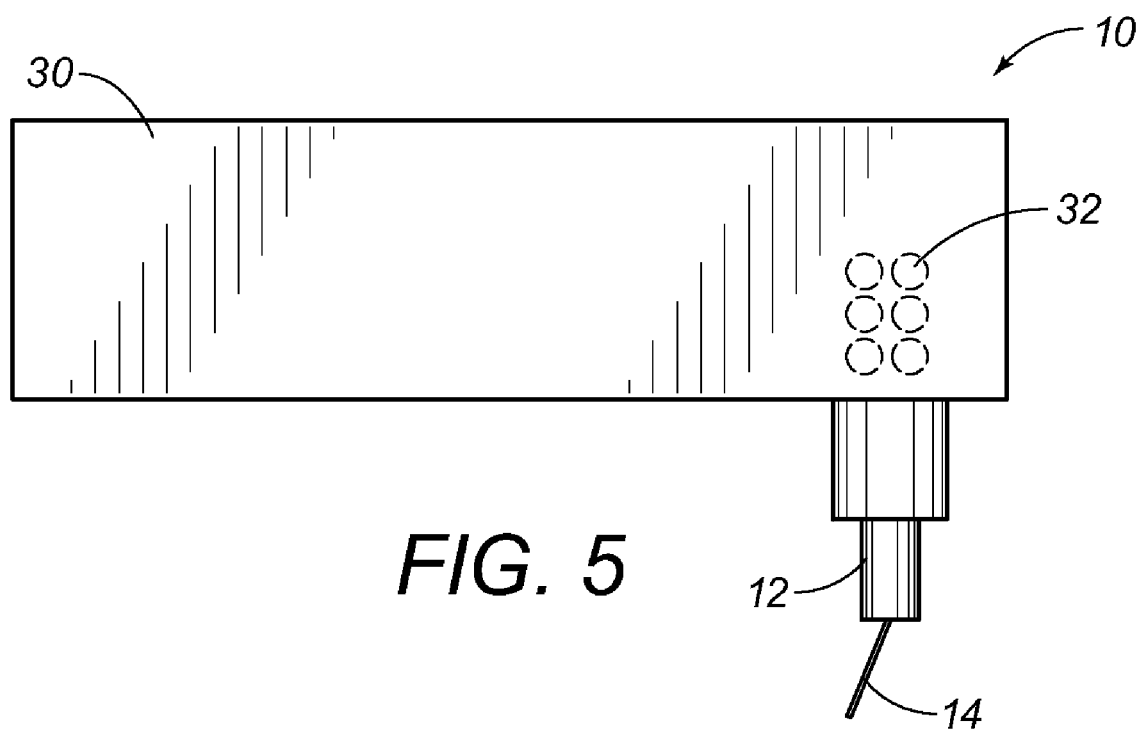
FIG. 5 is a plan view, partially transparent, of the welding apparatus of the present invention.

Referring to FIG. 5, there is shown the welding apparatus 10 of the present invention. The welding apparatus 10 has a wire bending apparatus 30. The wire bending apparatus 30 has a plurality of rollers 32 therein. As wire is fed through the rollers 32, the rollers 32 bend the wire 14 to a desired angle. The wire 14 then extends through the head 12 of the welder. As the wire 14 extends through the head 12, the wire temporarily loses the shape that it was bent into. However, when the wire 14 exits the head 12 it reverts to the angle to which it was bent by the rollers 32 bent it to. The welding processes then goes on as shown in previous and the following figures.

Figure 6:
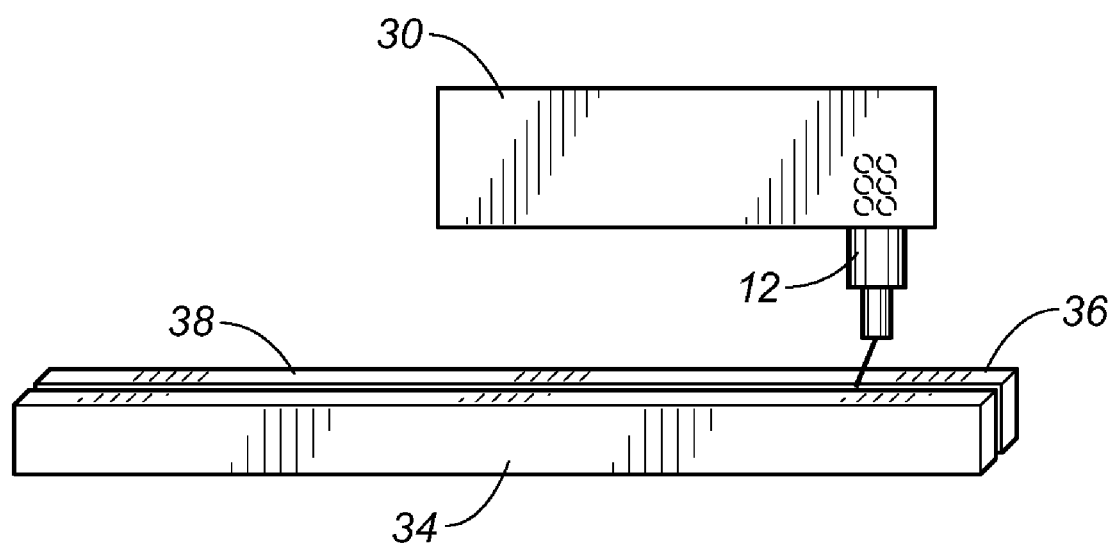
FIG. 6 is a plan view of the welding apparatus and method of the present invention.

FIG. 6 shows the welding apparatus 10 of the present invention welding two plates together. Shown are first plate 34 and second plate 36. Between the first plate 34 and the second plate 36 is the narrow gap 38. The welding apparatus 10 makes a first pass along the first and second plates 34 and 36 with the wire 14 angled toward the first plate 34. When the apparatus 10 reaches an opposite end of the first and second plates 34 and 36, the head 12 is rotated such that the wire 14 faces the second plate 36. The apparatus then makes a second pass along the plates 34 and 36 and returns to its initial position. The head 12 is then raised for the second pass. The head 12 is then again rotated so that the wire 14 faces the first plate 34. The apparatus 10 then moves along the plates 34 and 36. When it reaches an opposite end the head 12 again turns such that the wire 14 faces the second plate 36. The apparatus then passes again along plates 34 and 36 to its initial position. At this point the weld should be completed. Other inventions in the prior art use sinusoidal-shaped wire to tackle the problem of the narrow gap. However, with the sinusoidal wire, undesirable wobble is experienced. Using the bent wire of the present invention and by rotation of the head 12, such wobble is not experienced. The method and apparatus of the present invention may be used in submerged arc welding or gas metal arc welding technologies.

The foregoing disclosure and description of the invention is illustrative and explanatory thereof. Various changes in the details of the apparatus and the described method can be made without departing from the true spirit of the invention. The present invention should only be limited by the following claims and their legal equivalents.

We claim:

1. An arc welding apparatus comprising:
    a welding head having a longitudinal axis;
    a filler wire extending through said welding head so as to have an end portion extending outwardly therefrom, said end portion being bent at an constant obtuse angle with respect to said longitudinal axis of said welding head so as to face toward one direction relative to the welding head, said end portion having an end positioned at a constant distance from a fixed point from said welding head;
    a first metal piece having a surface;
    a second metal piece having a surface facing said surface of said first metal piece, said end portion of said filler wire and a portion of said welding head extending into a space between said surfaces of said first and second metal pieces;
    a translating means for moving said welding head along first pass and along a second pass in said space between said surfaces of said first and second metal pieces, said end portion of said filler wire being directed only to said surface of said first metal piece during the first pass;
    a rotating means for causing said end portion of said filler wire to face said surface of said second metal piece after the first pass, said translating means for moving said welding head such that said end portion of said filler wire is directed only to said surface of said second metal piece during said second pass.

2. The arc welding apparatus of claim 1, further comprising:
    a bending means cooperative with said filler wire for bending said filler wire at a desired angle prior to passing through said welding head.

3. The arc welding apparatus of claim 2, said bending means comprising:
    a plurality of rollers positioned adjacent said welding head, said filler wire extending through said plurality of rollers.

4. The arc welding apparatus of claim 1, said surfaces of said first and second metal pieces being in generally parallel relation to each other.

5. The arc welding apparatus of claim 1, further comprising:
    a backing bar positioned at a bottom of said metal pieces and extending across said space.

6. A method of arc welding a first metal piece to a second metal piece, the method comprising:
    extending a welding head into a space between said first and second metal pieces;
    bending a filler wire;
    passing the filler wire through said welding head such that an end of the filler wire extends in a constant direction toward a surface of said first metal piece relative to the welding head;
    translating said welding head along and adjacent said first metal piece;
    said end of the filler wire being positioned at a constant distance from an end of said welding head such that said end of said filler wire faces said first metal piece during the step of translating;
    arc welding the end of the filler wire onto the surface of said first metal piece;
    rotating the welding head toward a surface of said second metal piece such that said end of said filler wire faces said second metal piece;
    passing said filler wire through said welding head such that said end of said filler wire extends in a constant direction toward said surface of said second metal piece;
    traveling said welding head adjacent to and along said second metal piece, said end of said filler wire being positioned at a constant distance from said end of said welding head such that said end of said filler wire faces said second metal piece entirely during the step of traveling; and arc welding the end of the rotated bent filler wire onto said face of said second metal piece.

7. The method of claim 6, further comprising:

forming a welding head area by forming the space between said first and second metal pieces, the surface of one of said first and second metal pieces being generally parallel to a surface of another of said first and second metal pieces.

8. The method of claim 7, further comprising:

positioning a backing plate against a bottom of the first and second metal pieces, said backing plate extending across the spaces between the first and second metal pieces.

9. The method of claim 6, the step of bending comprising:

passing the filler wire through a plurality of rollers prior to passing the bent filler wire through said welding head.

10. A method of arc welding comprising:

forming a space between a first metal piece and a second metal piece;

positioning a welding head in the formed space between said first metal piece and said second metal piece;

passing a filler wire through said welding head such that an end portion of the passed filler wire extends outwardly of said welding head, said end portion being bent so as to extend in a direction toward a surface of said first piece relative to the welding head;

translating said welding head along and adjacent said first metal piece, said end portion having an end positioned at a constant distance from said welding head such that said end of said filler wire faces said first metal piece during the step of translating;

arc welding said end portion onto said surface of said first metal piece;

rotating said end portion so as to extend in a direction toward a surface of said second metal piece; and traveling said welding head adjacent to and along said second metal piece such that said end of said filler wire faces said second metal piece entirely during the step of traveling; and arc welding said end portion onto said surface of said second metal piece.

11. The method of claim 10, further comprising:

bending said filler wire prior to the step of passing said filler wire.

12. The method of claim 11, the step of bending comprising:

passing said filler wire through a plurality of rollers so as to impart a desired bend to said filler wire.

13. The method of claim 10, said end portion of said filler wire being bent at an obtuse angle relative to said welding head.

* * * * *